(12) United States Patent
Sweigart

(10) Patent No.: US 11,752,564 B1
(45) Date of Patent: Sep. 12, 2023

(54) FITTING REPAIR TOOL

(71) Applicant: David L. Sweigart, Denver, PA (US)

(72) Inventor: David L. Sweigart, Denver, PA (US)

( * ) Notice: Subject to any disclaimer, the term of this patent is extended or adjusted under 35 U.S.C. 154(b) by 93 days.

(21) Appl. No.: 17/337,675

(22) Filed: Jun. 3, 2021

(51) Int. Cl.
*B23G 5/06* (2006.01)
*B25B 13/50* (2006.01)
*B23G 9/00* (2006.01)

(52) U.S. Cl.
CPC ............. *B23G 5/06* (2013.01); *B23G 9/009* (2013.01); *B25B 13/5016* (2013.01); *B25B 13/5083* (2013.01)

(58) Field of Classification Search
CPC ... B23G 1/26; B23G 5/02; B23G 5/04; B23G 5/046; B23G 5/06; B23G 5/20; B23G 9/009; B23G 2200/14; B23G 1/52; B25F 1/00; B25B 13/5008; B25B 13/5083
USPC .................................................. 7/157
See application file for complete search history.

(56) References Cited

U.S. PATENT DOCUMENTS

| | | | | |
|---|---|---|---|---|
| 3,168,799 A | * | 2/1965 | Johnson ................. | B24D 15/02 15/118 |
| 4,213,216 A | * | 7/1980 | Strybel ................... | F16L 55/18 7/170 |
| 4,346,491 A | | 8/1982 | Kraus et al. | |
| 4,553,280 A | * | 11/1985 | Stright ................... | B25B 27/10 29/402.02 |
| 4,603,463 A | | 8/1986 | Wolbert et al. | |
| 4,899,409 A | * | 2/1990 | Cox, Jr. .................. | B08B 9/021 15/104.04 |
| 5,058,327 A | * | 10/1991 | Buchanan ............... | B08B 9/021 15/104.03 |
| 5,513,411 A | * | 5/1996 | Simon .................... | A47L 25/00 15/176.1 |
| 6,293,740 B1 | | 9/2001 | Schulte | |
| 6,349,624 B1 | * | 2/2002 | Fahringer ............... | B25B 13/48 81/177.8 |
| 6,360,578 B1 | * | 3/2002 | Bresnahan .............. | B25B 13/12 7/125 |
| 7,124,882 B1 | * | 10/2006 | Jadydy .................... | B08B 9/021 15/104.095 |
| 7,127,766 B1 | * | 10/2006 | Carter ..................... | B25B 13/48 81/437 |
| 7,625,291 B2 | | 12/2009 | Abraham et al. | |
| 7,887,424 B2 | | 2/2011 | Abraham et al. | |
| 8,047,923 B2 | | 11/2011 | Emerson | |
| 8,931,980 B2 | | 1/2015 | Knecht | |
| 9,794,882 B2 | | 10/2017 | Lee et al. | |

FOREIGN PATENT DOCUMENTS

FR 558923 A * 11/1922 ............... B23G 5/02

* cited by examiner

*Primary Examiner* — Edward T Tolan
(74) *Attorney, Agent, or Firm* — CRAMER PATENT & DESIGN, PLLC; Aaron R. Cramer

(57) ABSTRACT

A Fitting Repair Tool is a cross shaped device with each distal end of the cross having a unique low pressure gas fitting tool. The tool may be utilized for flammable, oxidizers and inert gas containers.

10 Claims, 5 Drawing Sheets

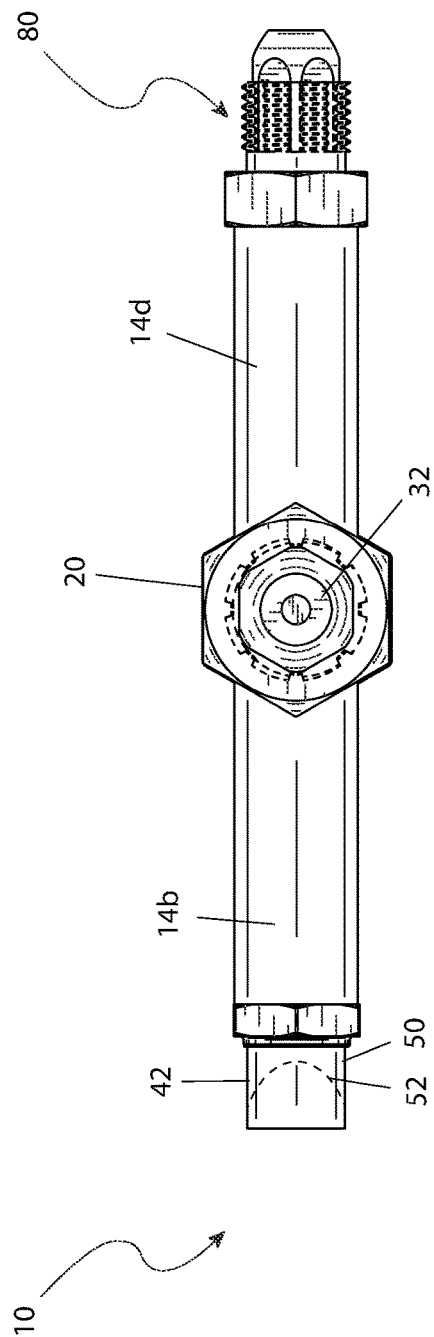
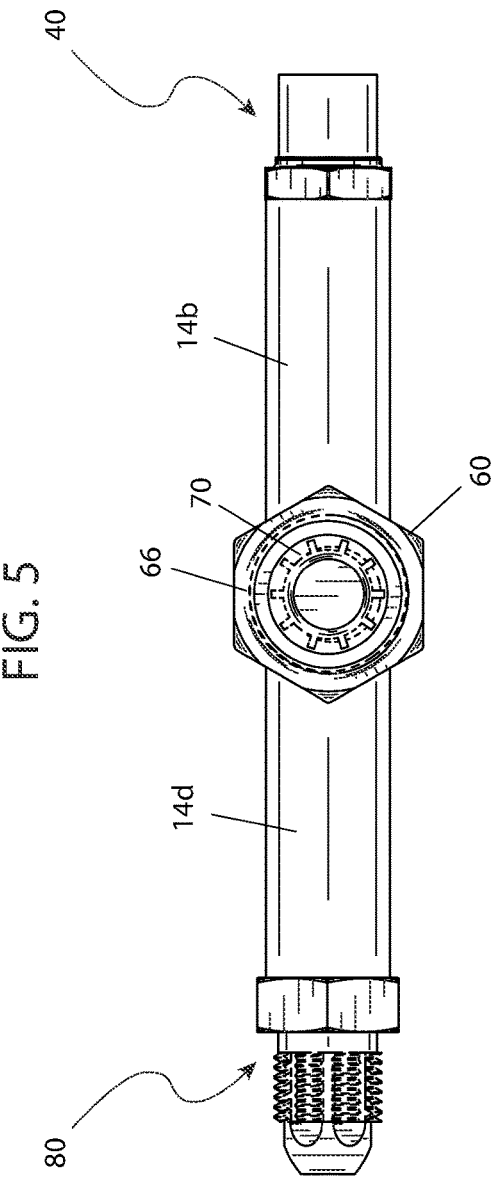
FIG. 5
FIG. 6

FITTING REPAIR TOOL

RELATED APPLICATIONS

None.

FIELD OF THE INVENTION

The present invention relates generally to a repair tool and more specifically to a fitting repair tool.

BACKGROUND OF THE INVENTION

Having the right tool for the right job is a critical component of an effective and safe workplace environment. So often injuries occur when the wrong tool is used. Additionally, the wrong tool can damage the whatever object the user is working on. Low pressure inert gas lines require careful maintenance and precision tools. The fitting repair tool accomplishes this task in a method and manner that is cost effective and efficient.

SUMMARY OF THE INVENTION

The principles of the present invention provides for a fitting repair tool having a body which has a first extension, a second extension, a third extension, and a fourth extension that are oriented into a cross-configuration. The first extension includes a first end. The second extension includes a second end. The third extension includes a third end. The fourth extension includes a fourth end. The first end includes a first protrusion having a first concave surface to fit over a male flare fitting to fix or repair the male flare fitting. The third end includes a third protrusion extending from the third end between a proximal portion and a distal portion. The fourth extension includes a fourth protrusion and is sized with a smaller diameter then the third protrusion.

The fitting repair tool also has a first tubular section which extends from the first end of the first extension and includes a first surface that defines a first cavity. The fitting repair tool also has a second tubular section which extends from the second end of the second extension. The second tubular section has a different diameter than the first tubular section. The second end includes a second protrusion that extends within the second tubular section.

The fitting repair tool also may have the second protrusion which includes a second concave surface to fit over the male flare fitting to clean or fix a first convex surface of the male flare fitting. The distal portion may include the first convex surface to receive a portion of a female flare fitting. The first convex surface may be fit within the female flare fitting to clean or fix the second concave surface of the female flare fitting. The proximal portion of the third protrusion may include a first threaded surface. The fourth protrusion extends between a proximal portion and a distal portion.

The proximal portion of the fourth protrusion may include a second threaded surface. The second threaded surface may be cut or form a plurality of female threads in a first female fitting by tapping. The distal portion may include a second convex surface receives a portion of the female flare fitting. The second convex surface may fit within the female flare fitting to clean or fix the concave surface of the female flare fitting. The first threaded surface may include a tap configuration to cut or form the female threads in a second female fitting by tapping. The extensions may be a shape selected from the group selected from an oval shape, an oblong shape, a triangular shape, a rectangular shape, a square shape a polygonal shape, an irregular shape, a uniform shape, a non-uniform shape, a variable shape, or a tapered shape.

The extensions may be connected by a connection method selected from the group consisting of a friction fit connection, a pressure fit connection, a mating engagement connection, a dovetail connection, a one or more clips connection, a one or more barbs connection, a tongue in groove connection, a threaded connection, a magnetic connection, or a key and corresponding key slot connection. The extensions may include a hex head connection utilized as a stop when attaching one of the fittings with one of the first end, the second end, the third end, or the fourth end. The first cavity may receive a portion of a male fitting. The first surface may include first threads engage the male fitting to fix or form a plurality of male threads on the male fitting.

The second tubular section may include a second surface that defines a second cavity to receive a portion of the male fitting. The second surface may include a plurality of second threads to engage the male fitting to clean or repair the male threads. The first surface may include a first die configuration to clean and or repair the male threads. The second surface may include a second die configuration.

BRIEF DESCRIPTION OF THE DRAWINGS

These and other features, aspects, and advantages of the present disclosure will become better understood with regard to the following description, appended claims, and accompanying drawings where:

FIG. 5 is a side view of the fitting repair tool, according to an embodiment of this disclosure;

FIG. 6 is a side view of the fitting repair tool, according to an embodiment of this disclosure; and, FIG. 7 is a top view of the fitting repair tool, according to an embodiment of this disclosure.

Figure 1:
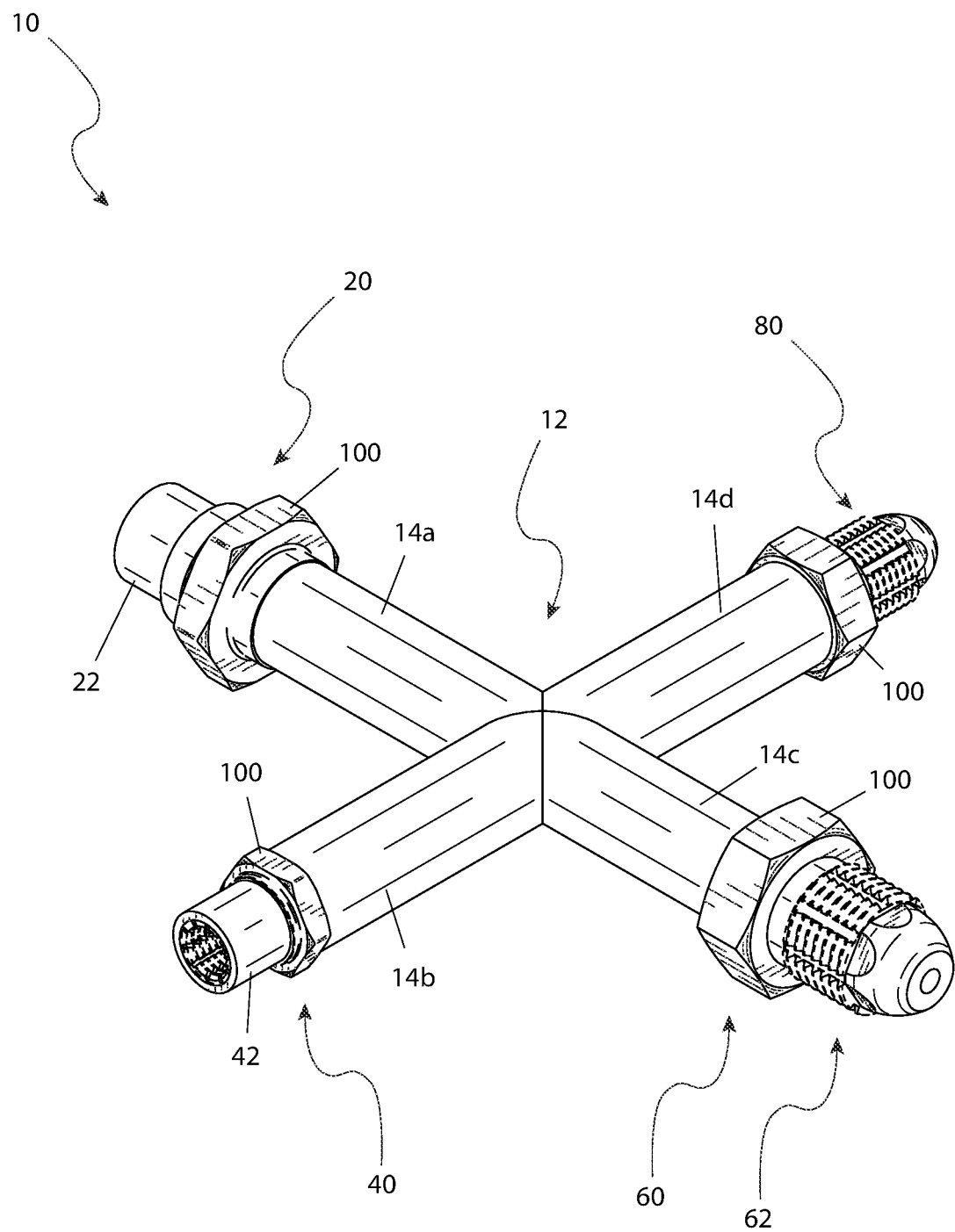
FIG. 1 is a perspective view of a fitting repair tool, according to an embodiment of this disclosure.

DESCRIPTIVE KEY 10 fitting repair tool
12 body
14a first extension
14b second extension
14c third extension
14d fourth extension
20 first end
22 first tubular section
24 first surface
26 first cavity
28 first threads
30 first protrusion
32 first concave surface
36 opening
40 second end
42 second tubular section
44 second surface
46 second cavity
48 second threads
50 second protrusion
52 second concave surface 60 third end
62 third protrusion
66 first threaded surface
70 first convex surface
80 fourth end
82 fourth protrusion
86 second threaded surface
90 second convex surface
100 hex head connection

DETAILED DESCRIPTION

The following disclosure is provided to describe various embodiments of a universal fitting repair tool 10. The fitting repair tool 10 can be utilized to fix hose and regulator fittings on compressed gas cylinders that become damaged, for example, by dropping the regulator or hose during tank or equipment changes. The tank valves and fittings are made from brass and are fairly soft. Once the hose end and/or threads are damaged it can cause leaks. In addition, the fitting repair tool 10 can be used to repair damaged threads on replacement bottles.

Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-7, an illustrative is a universal fitting repair tool 10 will now be discussed in more detail.

In some embodiments, the fittings include male threads, which are on the outside, like a bolt, or female threads, which are on the inside, like a nut. In some embodiments, the fittings include a male or female flare fitting.

Fitting repair tool 10 includes a body 12 having at least one (1) extension. In some embodiments, body 12 includes a first extension 14a, a second extension 14b, a third extension 14c, and a fourth extension 14d, as shown in the FIG. 1. First, second, third, and fourth extensions 14a, 14b, 14c and 14d are oriented to form a cross configuration. In some embodiments, first, second, third, and fourth extensions 14a, 14b, 14c and 14d may include various shapes, for example, oval, oblong, triangular, rectangular, square, polygonal, irregular, uniform, non-uniform, variable, and/or tapered. First, second, third, and fourth extensions 14a, 14b, 14c and 14d may be integrally connected or connected via a friction fit, pressure fit, mating engagement, dovetail connection, clips, barbs, tongue in groove, threaded, magnetic and/or key/keyslot.

First extension 14a includes a first end 20. A first tubular section 22 extends from first end 20 and includes a first surface 24 that defines a first cavity 26. First cavity 26 is configured to receive a portion of a male fitting. First surface 24 includes a die configuration to clean and or repair male threads. First surface 24 includes first threads 28 configured to engage the male fitting to fix and/or form male threads on the male fitting.

Figure 3:
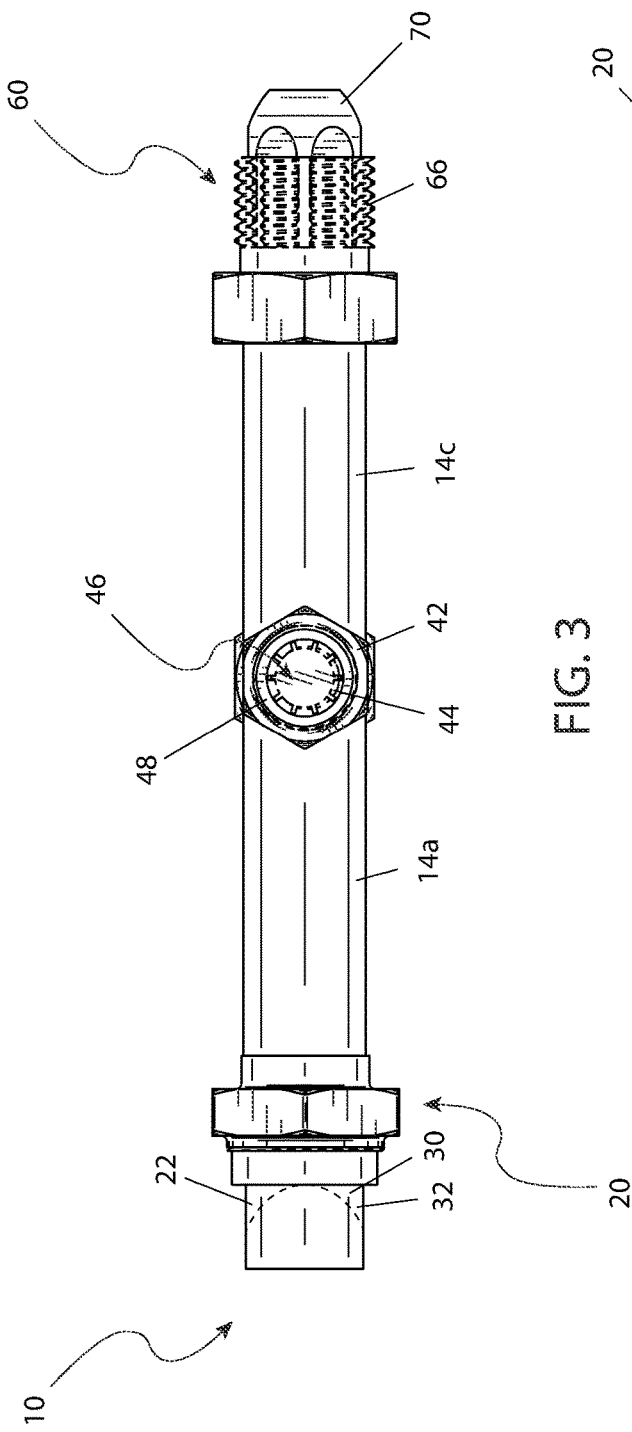
FIG. 3 is a side view of the fitting repair tool, according to an embodiment of this disclosure.

First end 20 includes a first protrusion 30 that includes a first concave surface 32. As shown in FIGS. 3 and 5. First concave surface 32 is configured to fit over a male flare fitting to fix and/or repair the male flare fitting.

Second extension 14b includes a second end 40. A second tubular section 42, having a different diameter than the first tubular section 22, extends from second end 40. Second tubular section 42 includes a second surface 44 that defines a second cavity 46, as shown in FIG. 3. Second cavity 46 is configured to receive a portion of a male fitting. Second surface 44 includes a die configuration. Second surface 44 includes second threads 48 configured to engage the male fitting to clean and or repair the male threads.

Figure 4:
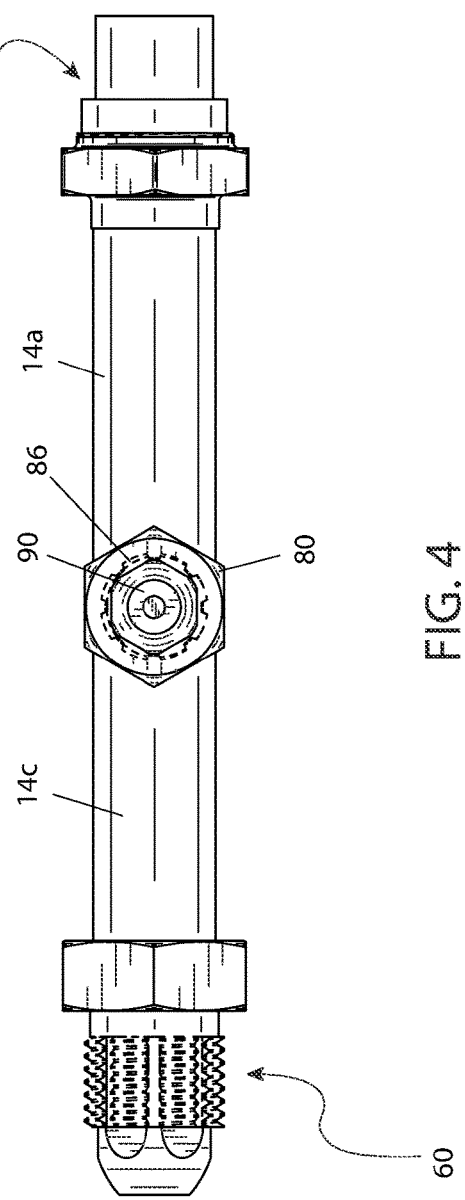
FIG. 4 is a side view of the fitting repair tool, according to an embodiment of this disclosure.
Figure 7:
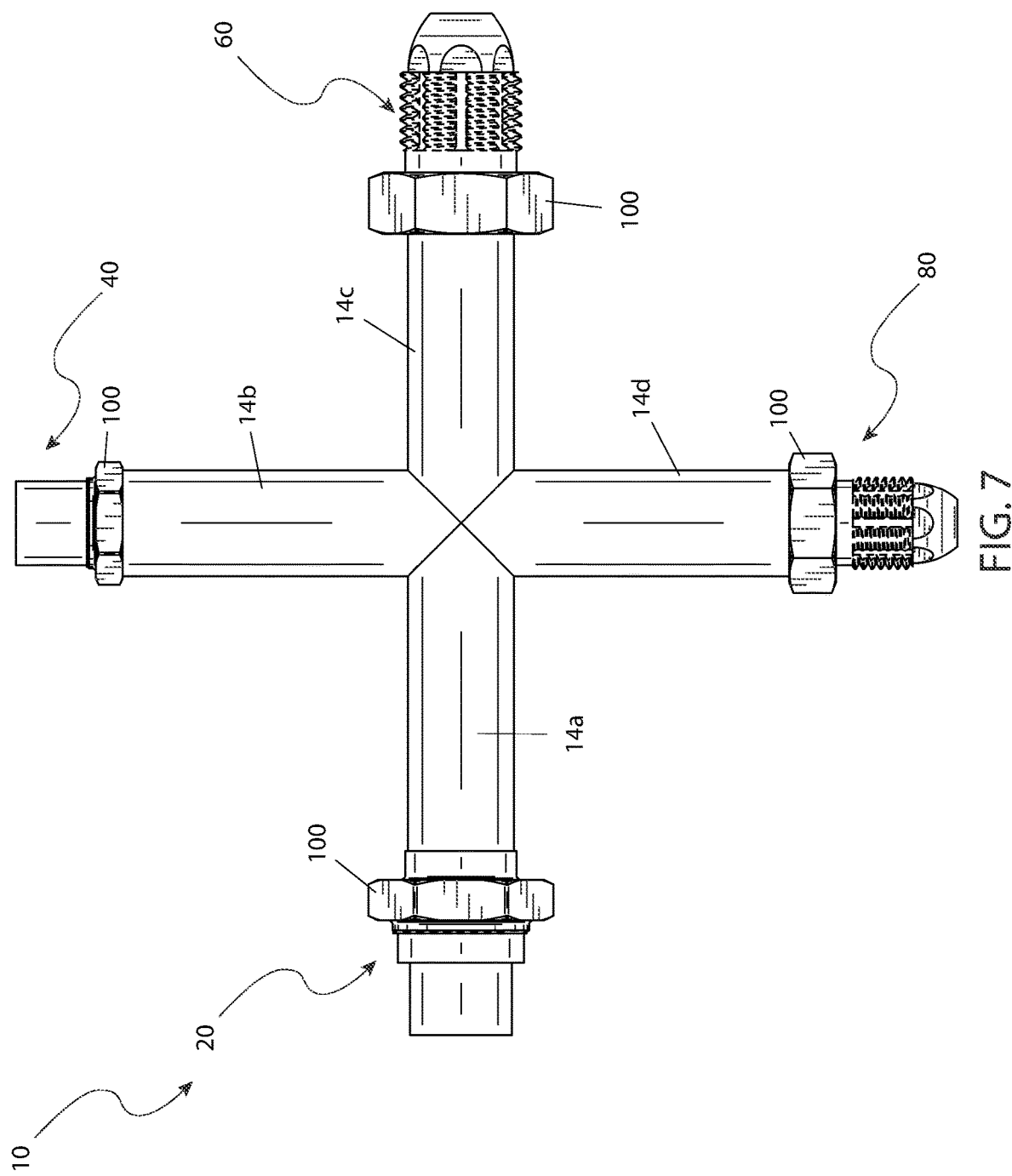

Second end 40 includes a second protrusion 50 that extends within second tubular section 42, as shown in FIG. 4. Second protrusion 50 includes a second concave surface 52. Second concave surface 52 is configured to fit over a male flare fitting to clean and/or fix the convex surface of the male flare fitting.

Third extension 14c includes a third end 60. A third protrusion 62 extends from third end 60. Third protrusion 62 extends between a proximal portion and a distal portion. Proximal portion of third protrusion 62 includes a first threaded surface 66. First threaded surface 66 includes a tap configuration configured to cut and/or form female threads in the female fitting by tapping.

Distal portion includes a first convex surface 70 configured to receive a portion of a female flare fitting, as shown in FIG. 3. First convex surface 70 is configured to fit within the female flare fitting to clean and/or fix the concave surface of the female flare fitting.

Fourth extension 14d includes a fourth end 80. A fourth protrusion 82, sized with a smaller diameter then the third protrusion 62, as shown in FIG. 1. Fourth protrusion 82 extends from fourth end 80. Fourth protrusion 82 extends between a proximal portion and a distal portion. Proximal portion of fourth protrusion 82 includes a second threaded surface 86. Second threaded surface 86 is configured to cut and/or form female threads in the female fitting by tapping.

Figure 2:
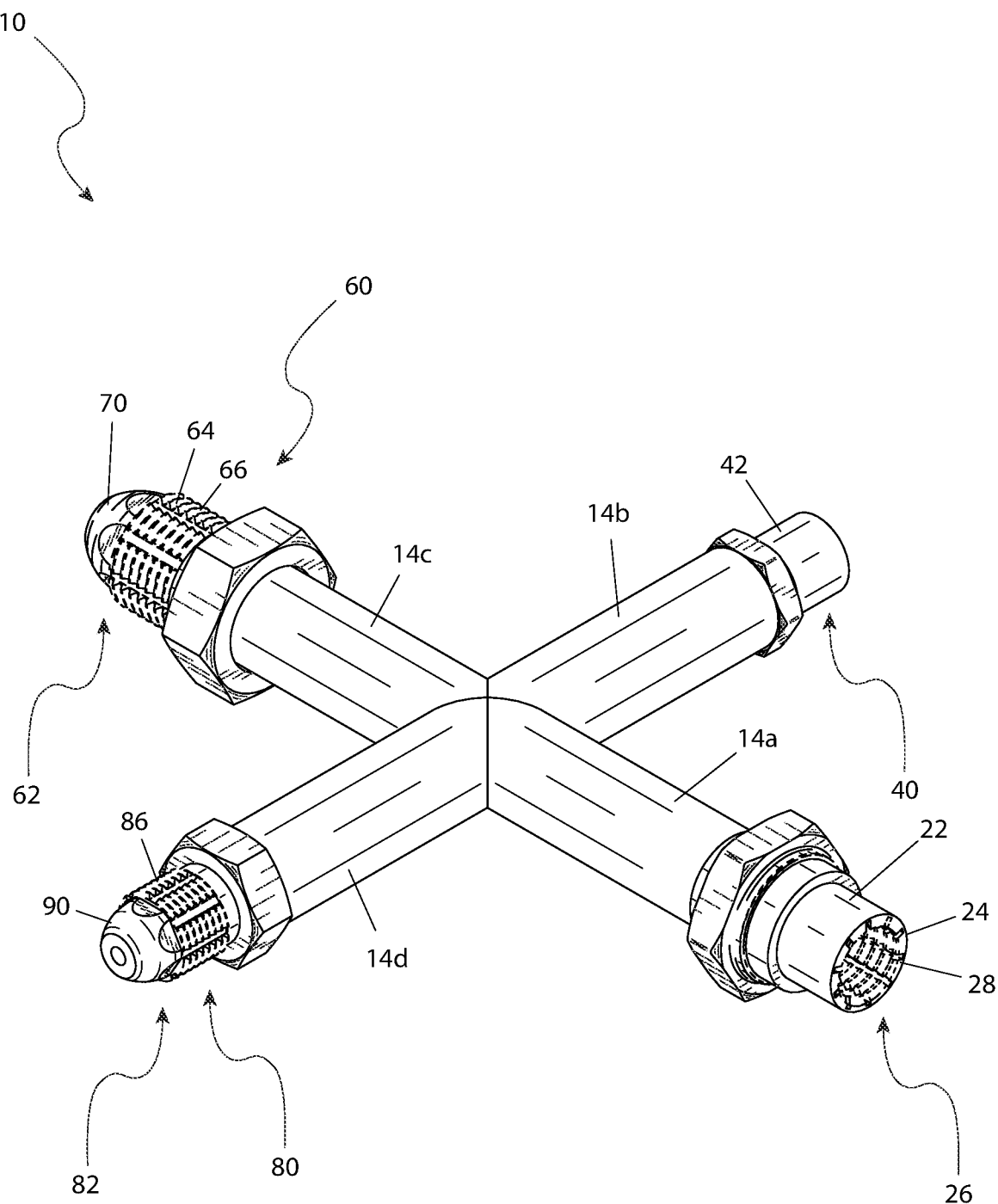
FIG. 2 is a perspective view of the fitting repair tool, according to an embodiment of this disclosure.

Distal portion includes a second convex surface 90 configured to receive a portion of a female flare fitting, as shown in FIG. 2. Second convex surface 90 is configured to fit within the female flare fitting to clean and/or fix the concave surface of the female flare fitting.

In some embodiments, each extension 14a, 14b, 14c, 14d includes a hex head connection 100. The hex head connection 100 is configured to provide a means for utilizing a tool, for example, a wrench to apply a torque force to the fitting repair tool 10 as needed. In some embodiments, the hex head connection 100 can be utilized as a stop when attaching the fitting with one (1) of first, second, third, or fourth ends 20, 40, 60 and 80.

In some embodiments, the fitting repair tool 10 can be utilized with compressed gas cylinders have standardized CGA fittings. Each first, second, third, and fourth end (20, 40, 60 and 80) is equipped with a different compressed gas association (CGA) fittings to allow the tool to be utilized with various sized fittings. Each first, second, third, and fourth end (20, 40, 60 and 80) will repair female or male threads as well as flare fittings.

In operation, a user will select the proper size and type of fitting in need of repair. The appropriate first, second, third, or fourth end (20, 40, 60 or 80) is threaded onto the fitting to be repaired, this process will have two (2) purposes, a first to clean and dress the threads, and a second to mount and align the tool for fitting seat repair. In some embodiments, a wrench may be required to repair badly damaged threads. Fitting repair tool 10 is rotated slowly clockwise and with slight inward pressure to engage cutting edge to seat of fitting. In some embodiments, the fitting repair tool 10 is rotated at least two (2) revolutions of three hundred sixty degrees (360°). Fitting repair tool 10 is disengaged from fitting, for example, by rotating fitting repair tool 10 in an opposite direction.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

The invention claimed is:

1. A fitting repair tool, comprising:
   a body having a first extension, a second extension, a third extension, and a fourth extension that are oriented into a cross-configuration, the first extension includes a first end, the second extension includes a second end, the third extension includes a third end, the fourth extension includes a fourth end, the first end includes a first protrusion having a first concave surface to fit over a male flare fitting to fix or repair the male flare fitting, the third end includes a third protrusion extending from the third end with a proximal portion and a distal portion, and the fourth extension includes a fourth protrusion is sized with a smaller diameter then the third protrusion;
   a first tubular section extending from the first end of the first extension, the first tubular section includes a first surface that defines a first cavity; and
   a second tubular section extending from the second end of the second extension, the second tubular section having a different diameter than the first tubular section, the second end includes a second protrusion that extends within the second tubular section;
   wherein the second protrusion includes a second concave surface to fit over the male flare fitting to clean or fix a first convex surface of the male flare fitting;
   wherein the distal portion of the third end includes the first convex surface to receive a portion of a female flare fitting;
   wherein the proximal portion of the third protrusion includes a first threaded surface;
   wherein the fourth protrusion extends between a proximal portion and a distal portion of the fourth end;
   wherein the proximal portion of the fourth protrusion includes a second threaded surface;
   wherein the second threaded surface is cut or form a plurality of female threads in a first female fitting by tapping;
   wherein the distal portion of the fourth end includes a second convex surface receives a portion of the female flare fitting;
   wherein the first cavity receives a portion of a male fitting;
   wherein the first surface includes first threads engage the male fitting to fix or form a plurality of male threads on the male fitting; and
   wherein the second tubular section includes a second surface that defines a second cavity to receive a portion of the male fitting.

2. The fitting repair tool, according to claim 1, wherein the first convex surface is fit within the female flare fitting to clean or fix the second concave surface of the female flare fitting.

3. The fitting repair tool, according to claim 1, wherein the second convex surface fit within the female flare fitting to clean or fix the concave surface of the female flare fitting.

4. The fitting repair tool, according to claim 1, wherein the first threaded surface includes a tap configuration to cut or form the female threads in a second female fitting by tapping.

5. The fitting repair tool, according to claim 1, wherein the extensions are a shape selected from the group selected from an oval shape, an oblong shape, a triangular shape, a rectangular shape, a square shape a polygonal shape, an irregular shape, a uniform shape, a non-uniform shape, a variable shape, or a tapered shape.

6. The fitting repair tool, according to claim 1, wherein the extensions are connected by a connection method selected from the group consisting of a friction fit connection, a pressure fit connection, a mating engagement connection, a dovetail connection, a one or more clips connection, a one or more barbs connection, a tongue in groove connection, a threaded connection, a magnetic connection, or a key and corresponding key slot connection.

7. The fitting repair tool, according to claim 1, wherein each of the extensions include a hex head connection utilized as a stop when attaching one of the fittings with one of the first end, the second end, the third end, or the fourth end.

8. The fitting repair tool, according to claim 1, wherein the second surface includes a plurality of second threads to engage the male fitting to clean or repair the male threads.

9. The fitting repair tool, according to claim 1, wherein the first surface of the first tubular section includes a first die configuration to clean and or repair the male threads.

10. The fitting repair tool, according to claim 1, wherein the second surface of the second tubular section includes a second die configuration.

* * * * *